United States Patent Office 2,726,098
Patented Dec. 6, 1955

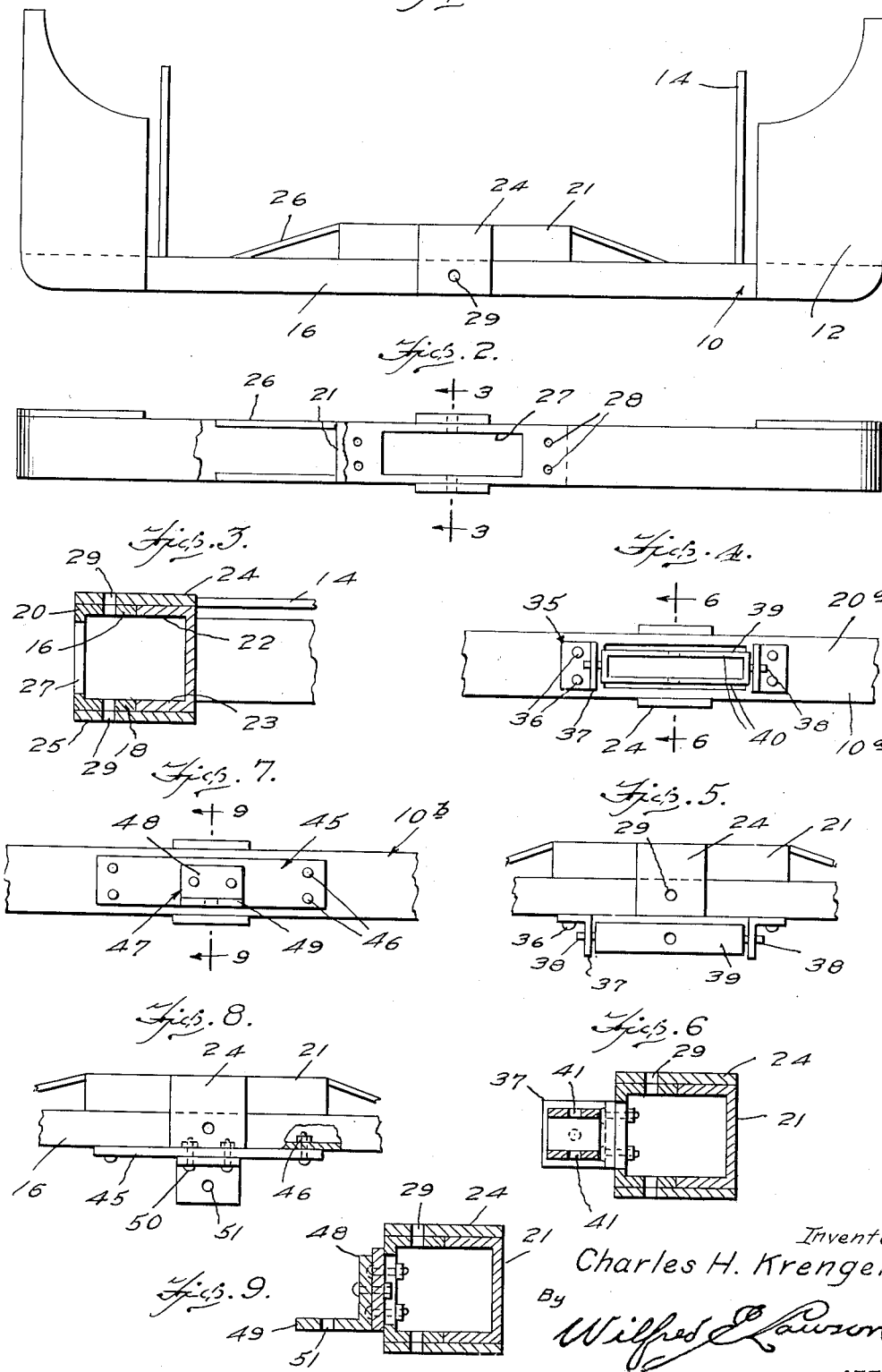

2,726,098

REAR BUMPER HITCH

Charles H. Krengel, Twin Falls, Idaho

Application August 18, 1953, Serial No. 374,845

4 Claims. (Cl. 280—500)

This invention relates generally to a vehicle hitching device and is directed particularly to an improved hitch of a universal nature.

A principal object of the present invention is to provide a rear bumper universal hitch for motor vehicles whereby connection may be made between the bumper and a trailer vehicle by means of any one of a number of different coupling devices such as a trailer tongue and pin or a trailer ball.

Another object of the invention is to provide an improved rear bumper structure designed to provide a universal hitch means and wherein novel reinforcing structure forms a part of the bumper which not only strengthens the bumper to withstand pulling strains but also to withstand strains imposed thereon as a result of being struck by other vehicles or by being backed into an obstruction.

Other objects and advantages of the invention will become apparent as the description of the same proceeds and the invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

In the drawing:

Figure 1 is a view in top plan of the improved reinforced bumper structure and hitch means, comprising the present invention.

Figure 2 is a view in rear elevation of the same with portions broken away.

Figure 3 is a transverse section taken substantially on the line 3—3 of Figure 2 and on an enlarged scale.

Figure 4 is a view in rear elevation of the middle portion of a modified form of the hitch structure.

Figure 5 is a view in top plan of the structure illustrated in Figure 4.

Figure 6 is a transverse section taken substantially on the line 6—6 of Figure 4.

Figure 7 is a view in rear elevation of the bumper structure of Figure 1 showing a manner of applying thereto a reversible hitch bracket.

Figure 8 is a view in top plan of the modified embodiment shown in Figure 7.

Figure 9 is a sectional view taken substantially on the line 9—9 of Figure 7.

Referring now more particularly to the drawing the numeral 10 generally designates a bumper bar of a type commonly employed across the rear of a motor vehicle and wherein the bar at each end is provided with a tread plate 12 and suitable tie rods 14 for facilitating the attachment of the bumper to the motor vehicle chassis frame, not shown.

The bumper bar 10 is, as shown most clearly in Figure 3, of channel iron construction and comprises the top and bottom flange portions 16 and 18 respectively and the connecting web 20, the bar being mounted in position with the channel directed forwardly or toward the vehicle to which the bumper is attached.

For reinforcing the channel bar or bumper bar 10 there is provided a short length of channel iron which is designated 21 and which is positioned against the rear of the bumper bar 10 with the top and bottom flanges 22 and 23 thereof against the rear edges of flanges 16 and 18 as shown in Figure 3 so that the middle portion of the bumper structure is of box form as shown in Figure 3 and the abutting edges of the flanges 16 and 22 and 18 and 23 are suitably welded together and to further reinforce the structure there is positioned upon the top and bottom flanges of the two channel iron bars 10 and 21, the top and bottom reinforcing plates 24 and 25 respectively.

Extending from each end of the short reinforcing channel iron 21, in the planes of the top and bottom flanges 22 and 23 are the laterally extending and forwardly angled brace rods 26 which have their outer ends welded to the rear edges of the flanges 16 and 18.

At the transverse center of the bumper bar 10 the web 20 is provided with the horizontally extending long rectangular opening 27 and at each end of this opening the web is provided with a pair of vertically spaced bolt holes 28, for the purpose hereinafter stated.

Formed vertically through the flanges 16 and 18 and the reinforcing plates 24 and 25 are the vertically aligned holes 29 which are designed to receive a coupling pin, not shown.

In the use of the bumper hitch structure thus described a draft or hitch tongue having a suitable coupling pin hole therethrough, as introduced into the opening 27 so that the coupling pin hole is aligned vertically with the holes 29 and the desired coupling pin, not shown, is then extended downwardly through the aligned holes 29 and through the hole of the coupling or draft tongue so as to effect the desired connection.

In addition to the structure described being particularly strong to withstand pulling strains due to the reinforcing arrangement of the reversely positioned short channel iron section 16 and the plates 24 and 25, secured to the bumper bar 10, the entire bumper bar is strengthened to withstand blows imposed thereagainst in the event that another vehicle runs into the bumper or in the event that the motor vehicle carrying the bumper is backed up against some solid structure.

Figures 4, 5 and 6 show a modified embodiment of the hitch whereby means is provided to allow for relative movements in a vertical plane between the draft vehicle and the trailer structure. In this modified construction the web portion 20a of the channel iron bumper bar which is generally designated 10a, has secured thereto at the ends of the opening 27, the bracket plates 35, by means of bolts 36 passing through one of the two right angularly related flanges, one of which flanges for each plate, designated 37, extends rearwardly from the bumper bar. These rearwardly extending flanges 37 are provided with suitable apertures to receive pivot or trunnion pins 38, carried by and extending outwardly from the two ends of the elongate box frame 39 which is positioned between the flanges 37 of the brackets 35 and supported by the trunnions 38 for turning movement. This box frame 39 has the top and bottom walls 40 which are provided with aligned openings 41 and the other two sides of the box frame are open, as is clearly shown in Figures 4 and 6, to have an apertured draft tongue extended through the box or into the box to a position where the coupling pin hole of such tongue is aligned with the openings or holes 41 to receive the desired coupling pin, not shown. When such a coupling tongue is connected to the pivoted box frame 39 it will be seen that there is established a hinge connection, turning on a horizontal transverse axis, which will permit a relative up and down movement of the draft vehicle and the trailer.

Figures 7 to 9 illustrate still another embodiment of the invention wherein is provided a reversible hitch designed for accommodating a draft tongue which may be too high or too low for connection with the other hitches.

In this last embodiment there is positioned across the openings 27, a plate 45 having suitable bolt openings at its ends for alignment with the openings 28, to receive securing bolts 46.

At its center plate 45 has positioned thereagainst one of two right angularly related flanges of a hitch bracket which is generally designated 47 and the flanges of which are designated 48 and 49. The flange 48 is provided with suitable openings to receive removable bolts 50 which also pass through the plate 45 and the other flange 49 is provided with an opening 51 to receive a coupling pin, not shown, of a draft tongue.

It will be seen that in the construction shown in Figures 7 to 9 inclusive the coupling bracket 47 may be secured to the plate 45 with the apertured flange 49 near the bottom of the plate and of the bumper bar which is generally designated 10b or, if necessary the bracket 47 may be reversed so that the apertured flange 49 may be positioned near the top of the bumper bar 10b.

From the foregoing it will be apparent that there is provided by the present invention a novel reinforced rear bumper structure and a universal hitch construction of relatively simple design but of strong and durable character and one in which connections may be easily and quickly made with the conventional apertured draft tongue.

I claim:

1. A reinforced rear bumper and hitch comprising a U-channel bumper bar having top and bottom longitudinal flanges and a web portion connecting the same at the outer side edges thereof, a second relatively short U-channel bar having longitudinal flanges and a web portion connecting the same at the inner side edges thereof, the outer longitudinal edges of the second channel being abutted against and welded to the inner longitudinal edges of the bumper bar centrally of the same, pairs of bracing rod struts extending from the ends of the second channel bar in laterally diverging relation and secured at their outer ends to the inner side edges of the said flanges of the bumper bar, a reinforcing plate positioned centrally across the tops and bottoms of the two channel bars and welded to the said flanges thereof and means carried by the bumper bar for facilitating the attachment of a trailer coupler thereto.

2. The invention according to claim 1, wherein the said means comprises an opening formed in the bumper bar web portion and vertically aligned openings formed through said reinforcing plates and the top and bottom longitudinal flanges for receiving a coupler pin adapted to pass through an end of a coupler element inserted into the first opening.

3. The invention according to claim 1, wherein said means comprises an elongate box frame having two opposite side walls provided with aligned coupling pin openings and opposite open sides to receive an end of a coupler element, and means for pivotally supporting said frame at its ends horizontally upon the web portion of the bumper bar.

4. The invention according to claim 3, wherein said pivotal supporting means comprises a pair of angle brackets bolted to the bumper, bar web and having outwardly extending apertured flanges and pivot trunnions extending from the ends of the frames and rotatably engaged in the apertures of said flanges.

References Cited in the file of this patent

UNITED STATES PATENTS

| | | |
|---|---|---|
| 2,151,920 | Jandus et al. | Mar. 28, 1939 |
| 2,348,655 | Schuling | May 9, 1944 |
| 2,492,914 | Barden | Dec. 27, 1949 |
| 2,599,638 | Huxford | June 10, 1952 |
| 2,649,308 | Bice | Aug. 18, 1953 |
| 2,666,654 | Gray | Jan. 19, 1954 |